United States Patent Office 2,705,198
Patented Mar. 29, 1955

2,705,198

WALLBOARD COMPOSITION AND METHOD OF MAKING SAME

Hermann G. Seybold, Westport, Conn.

No Drawing. Application April 19, 1950,
Serial No. 156,952

4 Claims. (Cl. 92—3)

This invention relates to light weight structural board, sheet insulating material, and the like, hereinafter called "wallboard" for simplicity, containing fibrous material, mineral filler and binder composition, and to methods of producing the same.

A general object of this invention is to provide such fiber-containing wallboard which is effectively heat insulating and fire resistant, light in weight, strong, excellent soundproofing material, relatively free from tendencies to warp and swell on exposure to moisture, substantially waterproof, and desirably inexpensive to manufacture; and a unique method of producing the same.

A more specific object of the invention is to provide fiber-containing wallboard which includes particles of expanded perlite as a mineral constituent.

A further object is to provide such a wallboard composition which includes with fibrous material and mineral filler comprising particulate expanded perlite, a binder of water soluble silicate and an acidic precipitant for the water soluble silicate.

Another object of the invention is to provide an embodiment of the composition which is readily and economically made and permits efficient use thereof.

Other objects of the invention will in part be obvious and will in part appear hereinafter.

The invention accordingly comprises the several steps and the relation of one or more of such steps with respect to each of the others and the composition possessing the characteristics, properties and the relation of components which will be exemplified in the composition hereinafter described and the scope of the invention will be indicated in the claims.

The present wallboard preferably includes as its fibrous ingredient any suitable organic and/or inorganic fibrous material such as cellulose fiber, glass fiber or asbestos fiber; a mineral filler ingredient comprising or including, or consisting of particles of expanded perlite; and a binder composition comprising water soluble silicate and an acidic precipitant for the "water soluble silicate" which react to form precipitate solids performing a dual function of binding particles of the other ingredients together and also effectively increasing the fire resistant characteristic of the board. Expanded perlite is a particulated mass of naturally occurring perlite which has been subjected to expansion under high temperature treatments. The mineral filler ingredient may consist of expanded perlite particles or may include therewith an amount up to about 50% of other mineral filler particulate, such as diatomaceous earth; e. g., bentonite or that material marketed under the trade-name "Celite"; pumice, or unexpanded perlite. The fibrous material ingredient may consist of cellulose fiber, such as kraft, newsprint or wood fiber or other fibrous material, for example, asbestos fiber or glass fiber, or mixtures of such fibers in any proportions. Water soluble silicate preferably is employed in the form of a water solution thereof. Alkali metal silicates are examples of water soluble silicates which may be employed. Any water soluble acidic substance may be employed as the acidic precipitant and is preferably employed in the form of a water solution. Mineral acids and acid-reacting salts such as alum are particularly suitable as acid precipitants.

One embodiment of the wallboard of the present invention may be made by intimately mixing about 60 to 90 parts by weight of expanded perlite into a water slurry of the fibrous material with vigorous agitation. The slurry may contain about 10 to 40 parts by weight of fibrous material and the water component thereof may be in the weight ratio to fibrous material of about 20:1, or any other ratio commonly employed in the art for the production of fiber slurries. Sodium silicate in water solution may be added to the slurry in quantity equivalent to about 30 to 200 or more parts by weight of sodium silicate (calculated as $Na_2O + 3.9SiO_2$). I prefer to add the sodium silicate in strong solution such as 30° to 40° Baumé, although weaker solutions may be employed. Addition of sodium silicate may be accomplished before or after addition of the particles of mineral filler to the slurry. Moreover, the water solution sodium silicate may be employed in lieu of part or all of the water in forming a slurry of fibrous material. In the case where the sodium silicate provides substantially the entire liquid in the slurry, I prefer to dampen the fibers with water prior to formation of the slurry. In any case the resulting slurry containing fibrous material, mineral ingredient and sodium silicate is distinctly alkaline. After continued agitation for 2 to 15 minutes to secure uniform dispersion of mineral filler and sodium silicate, a strong solution of alum is slowly added to the slurry, while still under agitation, in amount sufficient only to neutralize the slurry as determined by indicator paper or other indicating means and form therein precipitates to serve as a binder for the other solids. In adding the acidic material, care must be taken to add it slowly not to employ too great a quantity thereof, so as to avoid excessive precipitation of solids which may cause the slurry to "set up." The amount of acidic material to be employed is that required to attain substantial neutrality and can readily be determined by acidifying to the neutral point as indicated by pH paper or other indicator means. In any given case the amount of acid required for such neutralization is dependent upon the alkalinity of the mixture of fibrous material, the mineral filler ingredient and the sodium silicate binder.

After neutralization by addition of acidic material to the slurry while under vigorous agitation to form the binder material in the form of water-insoluble precipitates, the agitation is stopped or the neutral slurry is removed from the zone of agitation and the mixture is then cast into a felted layer, such as by a Fourdrinier machine, or by pouring into a board-forming mold, for example, a form having a screen bottom. The felted layer may then be dewatered and compacted by means of application of suitable pressure thereto. For example, a press may be employed to apply to the layer in the mold a pressure of about 100 to 400 pounds per square inch. The resulting wet board may thereafter be dried or cured without application of heat, such as by air drying at temperatures below 100° F., or under moderate heat in an oven, such as at a temperature between about 100° to 200° F., to set up the binder precipitates. Such drying or curing procedures, which may take from about four to six hours, may be materially shortened by the employment of forced drying with the use of circulating unheated or heated air.

Instead of drying or curing by air drying or application of heat, the wet board may be cured by subjection to simultaneous application of heat and pressure in a hot press, for example, at pressures of about 100 to 400 pounds per square inch and temperatures of about 100° to 400° F.

A typical example of wallboard which has been found to be acceptably fire-resistant, light enough to permit ready handling, economical to manufacture and adaptable to various construction manipulations, such as sawing, nailing, plastering and painting may be prepared as follows. To an agitated water slurry of 1 part by weight of cellulosic fiber, 3 parts by weight of expanded perlite and 25 parts by weight of 40° Baumé sodium silicate solution are added. Sufficient quantity of a strong solution of alum in water is added to the resultant admixture still under agitation to obtain substantial neutralization thereof as determined by pH paper and to form the binder precipitates. The resulting slurry is then cast in a board-forming mold and dewatered by application of 300 pounds per square inch pressure. The resulting ⅜ inch board is cured at 145° F. for four hours. Such board showed a modulus of rupture of about 2500 pounds per square inch.

Neutralization of the sodium silicate by the acidic material promotes hydrolysis of the compound into relatively insoluble silicic acid compound, the reaction forming water-insoluble precipitates which upon curing, whether by air drying, by application of heat or by simultaneous application of heat and pressure, forms an excellent set binder for the mineral and fibrous constituents. The precise chemical composition of this set binder material is obscure, but for purposes of identification herein I prefer to call it "dehydrated silicic acid."

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Cured wallboard comprising as the major constituents thereof, particles of mineral filler at least about half of which are expanded perlite particles and substantially uniformly distributed throughout a felted mass of fibrous material fibers with substantially neutral dehydrated binder material in the form of water-insoluble precipitates resulting from neutralization reaction of water soluble silicate and water soluble acidic material, said binder material intimately bonding said fibers and particles into the mass and together.

2. The cured wallboard as defined in claim 1 characterized by said wallboard containing said major constituents in the relative amounts as result from inclusion of starter materials in the following relative proportions; 10 to 40 parts by weight of said fibrous material in the form of cellulosic fibers; 60 to 90 parts by weight of said mineral filler in the form of expanded perlite particles; 30 to 200 parts by weight of alkali metal silicate; and a neutralizing amount of water soluble acidic material.

3. A method of making cured wallboard comprising forming an aqueous slurry with the inclusion, as the major constituents, in addition to water, of dispersible fibers of fibrous material, particulate mineral filler of which expanded perlite particles constitute at least about half, and water soluble silicate; adjusting the pH of said slurry to substantial neutrality by water soluble acidic material to precipitate upon the fibers and expanded perlite particles water-insoluble reaction precipitates weighting said perlite particles and to serve as binder material; forming a cast board from such neutralized slurry; and curing the formed board to set the binder material.

4. A method of making cured wallboard comprising forming an alkaline aqueous slurry with the inclusion, as the major constituents, other than water, of dispersible cellulosic fibers, expanded perlite particles and alkali metal silicate; adding to said alkaline slurry substantially to neutrality thereof water soluble acidic material to precipitate upon the fibers and expanded perlite particles water-insoluble reaction precipitates weighting said perlite particles and to serve as binder material; casting the substantially neutralized slurry into a wet layer; dewatering said layer to form a wet uncured board; and curing said board to set the binder material.

References Cited in the file of this patent

UNITED STATES PATENTS

| | | |
|---|---|---|
| 42,450 | Van Derburgh | Apr. 19, 1864 |
| 77,991 | Lowery | May 19, 1868 |
| 228,328 | Ehrhardt | June 1, 1880 |
| 1,743,551 | Keeth | Jan. 14, 1930 |
| 2,046,296 | Roos et al. | June 30, 1936 |
| 2,217,119 | Kerr | Oct. 8, 1940 |
| 2,300,137 | Salisbury | Oct. 27, 1942 |
| 2,340,728 | Baker et al | Feb. 1, 1944 |
| 2,388,060 | Hicks | Oct. 30, 1945 |
| 2,407,247 | Briggs | Sept. 10, 1946 |
| 2,436,329 | Porter | Feb. 17, 1948 |
| 2,457,493 | Redfern | Dec. 28, 1948 |
| 2,626,864 | Miscall et al. | Jan. 27, 1953 |

FOREIGN PATENTS

| | | |
|---|---|---|
| 506,624 | Great Britain | June 1, 1939 |

OTHER REFERENCES

Ralston, Information Circular No. 7364, Bureau of Mines, August 1946, pages 6 and 8.